United States Patent [19]

Lunardon

[11] Patent Number: 5,542,245
[45] Date of Patent: Aug. 6, 1996

[54] COMPRESSED JEWELRY CHAIN AND METHOD OF MAKING SAME

[75] Inventor: Giulio Lunardon, Pove del Grappa, Italy

[73] Assignee: OroAmerica, Inc., Burbank, Calif.

[21] Appl. No.: 390,527

[22] Filed: Feb. 17, 1995

[51] Int. Cl.[6] .............................. B21L 3/00; B21L 13/00; B21L 17/00
[52] U.S. Cl. .................................... 59/35.1; 59/31; 59/80
[58] Field of Search .............................. 59/31, 35.1, 80, 59/28, 84, 78

[56] References Cited

U.S. PATENT DOCUMENTS

| D. 334,901 | 4/1993 | Bichi | D11/12 |
|---|---|---|---|
| D. 334,902 | 4/1993 | Bichi | D11/12 |
| D. 334,904 | 4/1993 | Bichi | D11/12 |
| 2,200,828 | 5/1940 | Augenstein | 59/35.1 |
| 2,424,924 | 7/1947 | Chernow | 59/80 |
| 3,720,391 | 3/1973 | Wahlbeck | 59/80 |

FOREIGN PATENT DOCUMENTS

| 506631 | 9/1992 | European Pat. Off. | 59/80 |
|---|---|---|---|
| 50750 | 5/1981 | Japan | 59/35.1 |
| 344864 | 4/1960 | Switzerland | 59/80 |

*Primary Examiner*—David Jones
*Attorney, Agent, or Firm*—Drucker & Sommers

[57] ABSTRACT

This disclosure relates primarily to the making of compressed single and double arrow jewelry chains, of precious or non-precious metal, and other unique surface designs, from open link chains wherein the regularly repeating apertures of the prior art chains have been substantially eliminated, thereby providing an exceedingly smooth look and silky feel to the completed chain. The compressed chain of this invention is made by first precisely aligning two or more open link chains together, side by side, along a single longitudinal axis, welding, as by soldering or brazing, the aligned open link chains, and subjecting the thusly aligned chains to a series of incremental compression steps, along the longitudinal axis of the aligned curb link chains. In this way, the regularly repeating apertures of the aligned open link chains are substantially eliminated while creating, as in the case of the use of single curb chains as the starting point, novel non-apertured arrow designs.

14 Claims, 3 Drawing Sheets

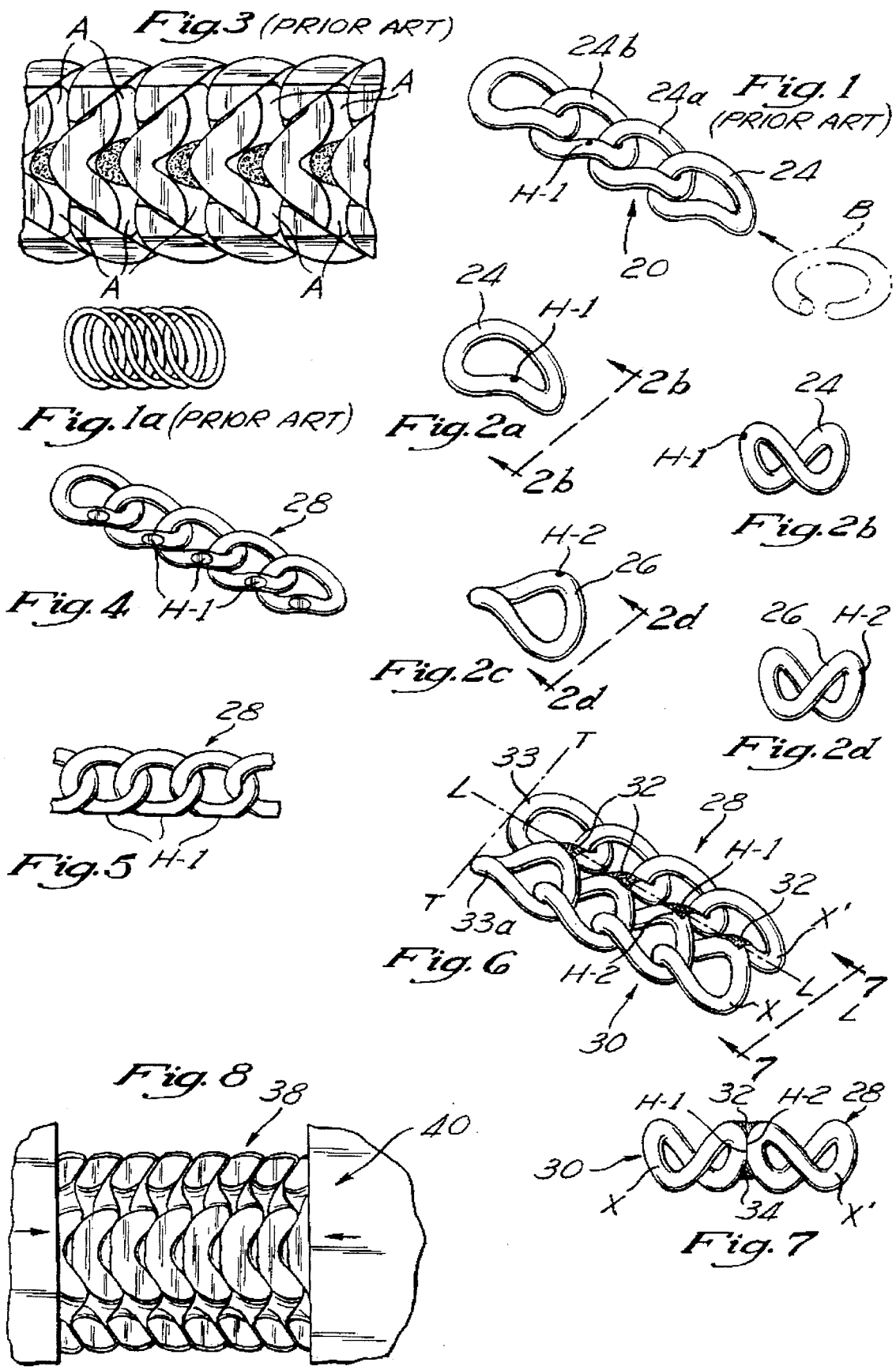

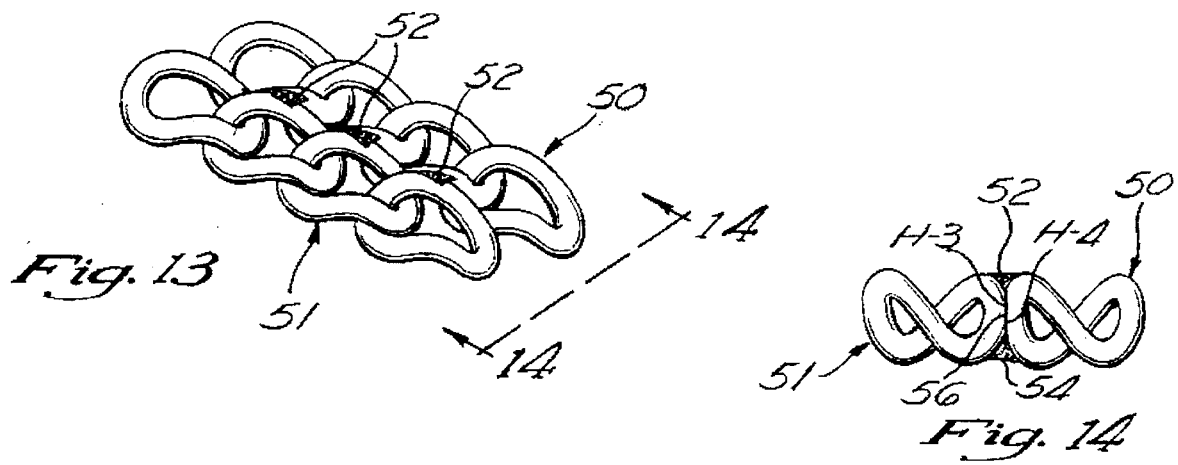
Fig. 13
Fig. 14
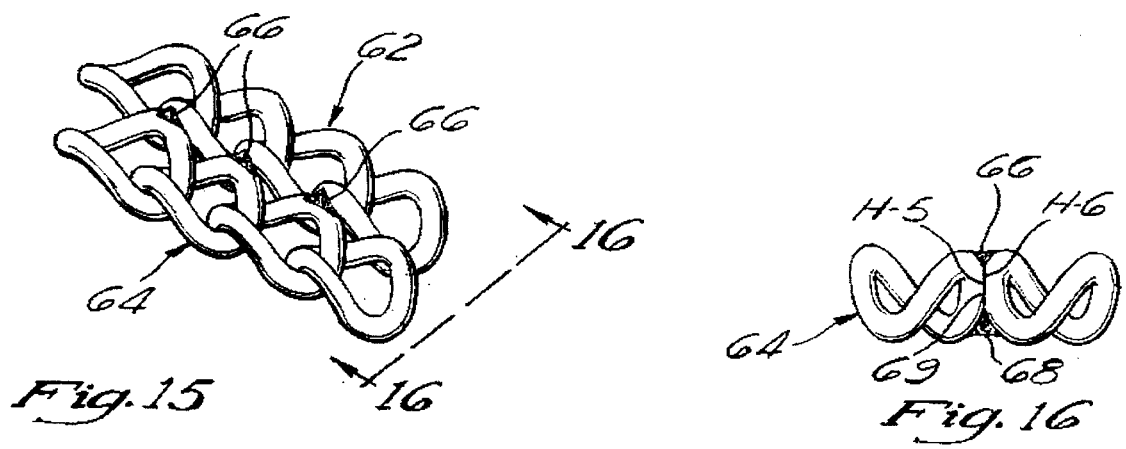
Fig. 15
Fig. 16
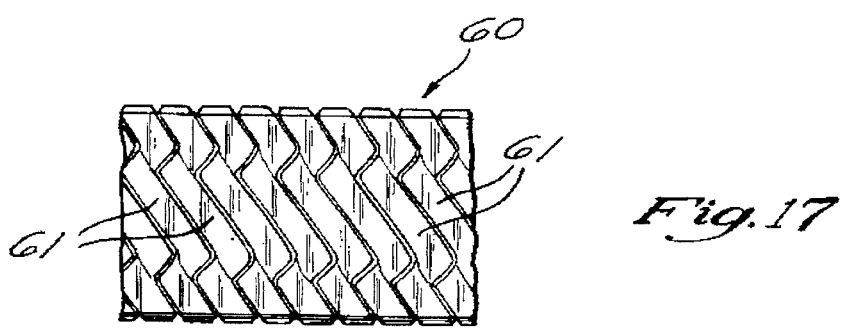
Fig. 17
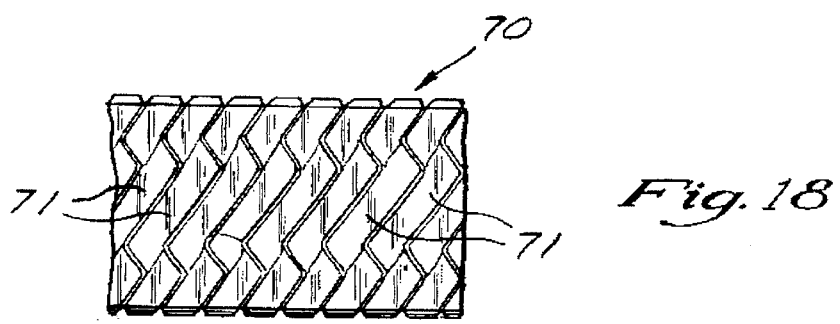
Fig. 18

COMPRESSED JEWELRY CHAIN AND METHOD OF MAKING SAME

BACKGROUND OF THE INVENTION

This invention relates to new and improved compressed and flattened jewelry chains having unique surface designs, and to the process for making same from open link chains such as curb link chains.

PRIOR ART

Jewelry chain made from curb link chain of precious or non-precious metal is well known in the jewelry art. Curb link chains are composed of single ovoid links generally twisted in cross-section, and each of which is intertwined with a single like link to build up the chain (see FIG. 1, prior art). This type of curb chain is known as a single curb chain. The links of the single curb chain may be twisted downwardly and to the right, as in FIGS. 2a and 2b, or twisted downwardly and to the left, as in FIGS. 2c and 2d.

Single curb chains have been used as the basic design for so-called single arrow chains and double arrow chains. A single arrow chain is made by, first, forming two single curb chains, a first of the two single curb chains having a portion of each link twisted in one direction, e.g. to the left as shown in FIG. 2 (a "left" curb chain), and the second of which has a portion of each link twisted in the opposite direction, i.e. to the right (a "right" curb chain). The two single curb chains are then placed side by side and soldered at points of abutment. The upper and lower surfaces of the resulting chain are then hammered and/or diamond-cut to achieve a flat, shiny, look. The resulting flat shiny, chain has a distinct arrow shaped pattern, the pattern containing regularly repeating apertures A therein, as shown in FIG. 3. A double arrow chain is built up by forming a first pair of left and right curb chains, then forming a second pair of left and right curb chains, and soldering the first and second pairs together, and hammering and/or diamond-cutting, as just described. The double arrow chain also contains regularly repeating apertures therein.

It is also to be noted that single curb chains, of the type shown in FIG. 1 have been compressed, along their longitudinal axis, to form a fairly flat chain without any appreciable gapping between adjacent links. The compressed chains are then flattened and widened, by conventional hammering techniques. The resultant effect is a compressed, flat, chain having a herringbone-like surface texture and without any apertures. The compressed flat chain may be diamond-cut, if desired, to achieve a shinier effect.

Curb chains are also made in a so-called "double" configuration wherein the open links of the chain are intertwined in a somewhat different manner than in the single curb chain as shown schematically in Figure 1a. Double curb chains, as well as single curb chains, have also been compressed and hammered and diamond-cut. The term "curb chains" or "curb link chains" as used herein and in the claims, means "single curb chains" or "double curb chains".

The present state of the art is such that, to the best knowledge and belief of the applicant, the production of compressed non-apertured single arrow chains and compressed non-apertured double arrow chains, from paired single or double curb chains, have not been made because of the inability of the art to maintain a perfect alignment of the paired single or double curb chains during the compression step.

BRIEF SUMMARY OF THE INVENTION

The invention relates to the making of compressed single and double arrow chains of precious or non-precious metal from open link chains wherein the regularly repeating apertures of the prior art arrow chains have been substantially eliminated, thereby providing an exceedingly smooth look and silky feel to the completed chain.

The non-apertured, compressed arrow chain of this invention is made by first precisely aligning two or more open link chains together, side by side, along a single longitudinal axis, welding, as by soldering or brazing the aligned open link chains, and subjecting the thusly aligned chains to a series of incremental compression steps, along the longitudinal axis of the aligned curb link chains. In this way, the regularly repeating apertures of the aligned open link chains are substantially eliminated while creating, as in the case of the use of single curb chains as the starting point, novel non-apertured arrow designs.

The compressed chain is then flattened, as by hammering, and is then made more flexible by means of conventional flexibilizing equipment. The surface of the compressed chain may also be diamond-cut to achieve further brilliance.

The invention also relates to the making of compressed non-apertured chains, of precious or non-precious metal, from open link chains such as venetian box chain and figaro chain wherein the repeating apertures of the prior art arrow chains have been substantially eliminated, thereby providing an exceedingly smooth look and silky feel to the completed chain.

BRIEF DESCRIPTION OF THE DRAWINGS

FIG. 1 is a perspective view of a segment of a single curb chain of the prior art in which the individual links have been twisted to the right;

FIGURE 1a is a perspective view, schematically showing the manner of intertwining the open links of a double curb chain of the prior art;

FIG. 2a is a perspective view of an individual link of FIG. 1;

FIG. 2b is an end view of FIG. 2a taken along the line 2b—2b;

FIG. 2c is a perspective view of an individual link twisted in the opposite direction to the link of FIG. 2a, i. e. to the left;

FIG. 2d is an end view of FIG. 2c, taken along the line 2d—2d;

FIG. 3 is a plan view of a segment of a single arrow chain of the prior art;

FIG. 4 is a perspective view of the curb chain of FIG. 1 modified by the facetting of portions of the curb links;

FIG. 5 is a plan view of FIG. 4;

FIG. 6 is a perspective view of two aligned and tack welded right and left single curb link chains;

FIG. 7 is an end view taken along line 7—7 of FIG. 6;

FIG. 8 is a plan view of the paired single curb chains of FIG. 6 after they have been compressed along their longitudinal axis;

FIG. 13 is a perspective view of aligned and soldered paired single curb chains in which the links of each single curb chain have been twisted to the right;

FIG. 14 is an end view of FIG. 13 taken along the line 14—14;

FIG. 15 is a perspective view of the aligned and soldered paired single curb link chains in which the links of each single curb chain have been twisted to the left;

FIG. 16 is an end view of FIG. 15 taken along the line 16—16;

FIG. 17 is a plan view of the chain resulting from the compressing and flattening of the paired single curb chains of FIG. 13; and FIG. 18 is a plan view of the chain resulting from the compressing and flattening of the paired single curb chains of FIG. 15.

DETAILED DESCRIPTION

Figure 9:
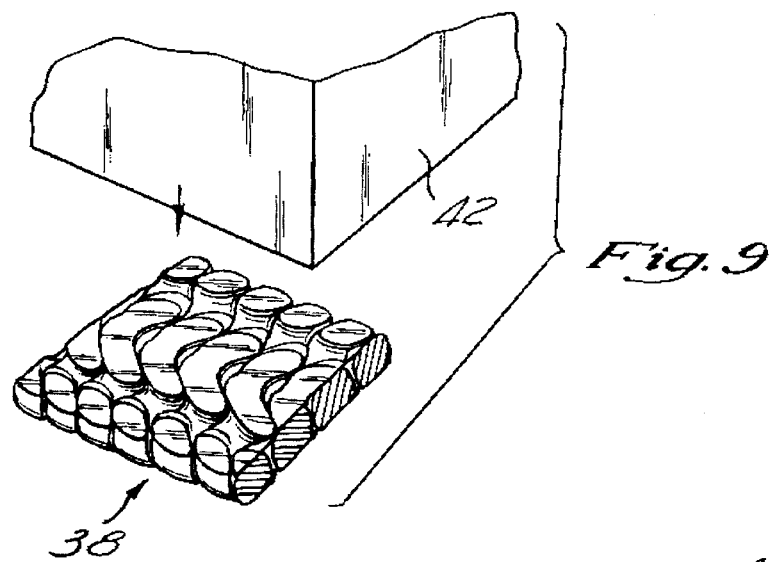
FIG. 9 is a perspective view, showing, in schematic form, the step of hammering the chain of FIG. 8.

The primary objective of this invention is to manufacture a flat, wide, brilliant looking chain having unique, complex surface designs from relatively simple open link chains such as single or double curb link, figaro, and venetian box chains. The process of this invention will be described with reference to single curb link chain as a starting point, by way of example only of the best mode of effecting the process of the invention.

The single curb link chain 20 of the prior art is shown in FIG. 1. The single curb link chain 20 comprises single ovoid links 24, 24a, 24b, etc. each of which is intertwined within the next adjacent open link in conventional fashion.

To create the desired chain, any combination of left and right single curb link chains may be utilized, as, for example, a left-left pair of single curb link chains, a right-right pair of single curb link chains, and a right-left pair of single curb link chains. Thus, a right single curb chain 28 and a left single curb chain 30 may be paired as the basis for the final chain design, as shown in FIGS. 6 and 7.

Because paired single curb chains 28, 30 are to be subjected to large forces of longitudinal compression and flattening, they must be suitably prepared. It has been found that the optimal preparation involves, first, creating planar surfaces H-1 on abutting portions of the interior sides of single curb chain 28, as shown in FIGS. 4 and 5, and creating like planar surfaces at H-2 on abutting portions of single curb chain 30. The planar surfaces are optimally made by diamond-cutting the rounded surfaces of the chain 28 at H-1 and H-2 (FIG. 7). The process of diamond-cutting, per se, is conventional and described in U.S. Pat. No. 5,353,584, incorporated herein by reference.

The links of the right and left chains 28, 30 are then placed in precise alignment with each other. The links of chains 28, 30 are precisely aligned when the leading edges of each of the side by side links of the chains, e.g. links 33, 33a, are precisely transversely aligned (along line T—T which is transverse to the longitudinal axis, L—L, of chains 28, 30 (FIG. 6). The chains 28, 30 are initially, tack welded, as by laser means, to each other at upper and lower areas 32, 34 adjacent planar areas H-1, H-2, as best shown in FIG. 7. The tack welds maintain the required precise alignment of the links with each other. Upper or lower tack welds are usually sufficient to maintain precise alignment inasmuch as the abutting planar surfaces, H-1, H-2, are then fused, as by solder or brazing, using conventional soldering or brazing materials, so that the paired single curb chains 28, 30 will not separate under the subsequent compression and flattening steps utilized in the process of this invention.

Compression of the tack welded and soldered paired chains 28, 30 next takes place, as schematically shown in FIG. 8, to form compressed chain 38 in which the gaps in the open links are substantially closed. In this step, the paired chains 28, 30 are compressed, by perhaps 0.5 mm for each increment of compression, the compressive force being exerted along the longitudinal axis of the paired chain. The compression machine 40 is conventional, and is of the same type that has been utilized to compress non-paired single curb chains.

Figure 10:
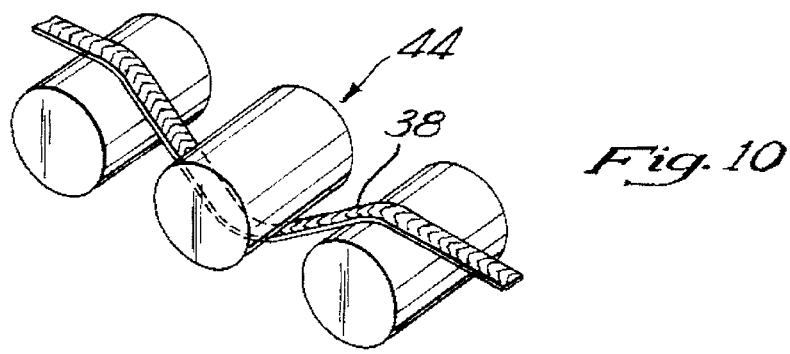
FIG. 10 is a perspective view of showing, schematically, the chain of FIG. 9 being rendered substantially more flexible than in its hammered state of FIG. 9.

The compressed chain 38 is then flattened, with conventional hammering equipment 42, schematically shown in FIG. 9. In the hammering step, the compressed chain is inherently widened and rendered very rigid. The chain 38 is therefore, flexibilized by conducting it through conventional flexibilizing equipment 44, schematically shown in FIG. 10.

Figure 11:
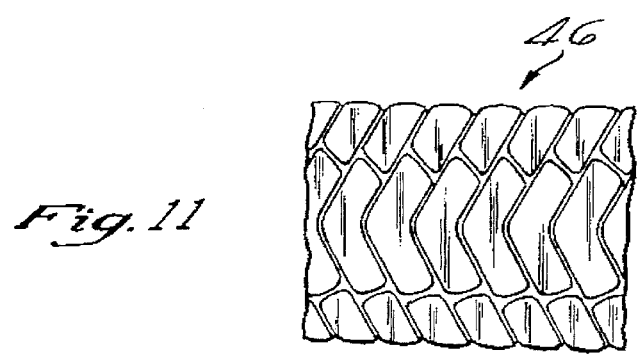
FIG. 11 is a, fragmentary, plan view of the flexibilized chain of FIG. 10.

The resulting chain flexibilized chain 46 (see FIG. 11) possesses a unique, non-apertured, arrow motif, but is nevertheless highly flexible, and kink-free. The is to say, the chain 46 may be repeatedly twisted but will spring back into its original flat shape without any fracturing of the chain. In contrast, if a single curb chain is compressed, hammered, flexibilized and diamond-cut, as described herein, the resulting chain is not as kink-free and durable as the paired, compressed, single curb chain 46.

Figure 12:
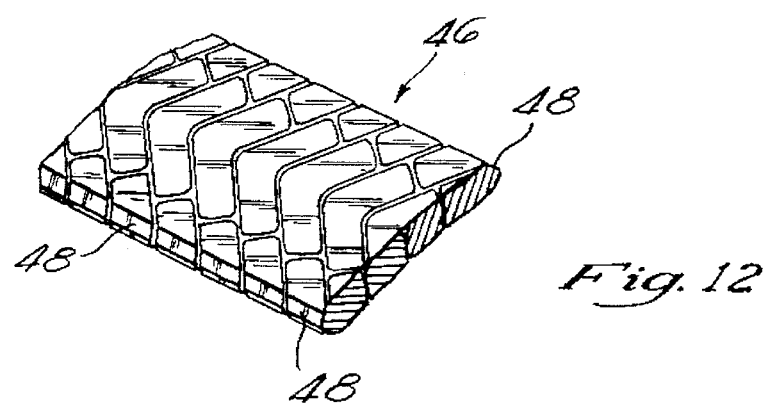
FIG. 12 is a perspective view of the chain of FIG. 11 modified with beveled outer edges.

The chain 46, optionally, may be diamond-cut for a more brilliant look, and its outer edges 48 may also be bevelled, by diamond-cutting, as shown in FIG. 12.

While right and left paired single curb chains have been shown and described, by way of example, as starting chains for the process of this invention, right-right paired single curb chains and left-left paired single curb chains may also be utilized as the starting chains. Thus, right-right paired single curb chains 50, 51 shown in FIGS. 13 and 14, may be placed in precise alignment, as earlier described with reference to FIGS. 6 and 7, and tack welded at 52, 54 to maintain their alignment. The abutting surfaces of chains 50, 51 are diamond-cut at H-3 and H-4 and soldered or brazed along the line of abutment 56. The right-right chains 50, 51 are then processed by compressing, hammering, flexibilizing, and optimally diamond-cutting, as described with reference to chain 30 of FIGS. 6 and 7. The resulting right-right chain 60 is shown in FIG. 17, and possesses a modified herringbone surface design in which the surface texture lines 61 slope, principally, from left to right, as viewed from top to bottom of FIG. 17.

Left-left paired single curb chains 62, 64 are shown in FIGS. 15 and 16, placed in precise alignment as earlier described with reference to FIGS. 6 and 7, and tack welded at 66, 68 to maintain their alignment. The abutting surfaces of chains 62, 64 are diamond-cut at H-5 and H-6, and soldered and brazed along the juncture line 69 of H-5 and H-6. The left-left curb chains 62, 64 are then processed by compressing, hammering, flexibilizing and, optionally, and diamond-cutting, as described with reference to chain 30 of FIGS. 6 and 7. The resulting left-left chain 70 is shown in FIG. 18, and possesses a modified herringbone design in which the surface texture lines 71 slope principally, from right to left, as viewed from top to bottom of FIG. 18.

While paired single curb chains of right-right, left-left, and right-left configuration have been shown and described as the starting point chains for the process by way of example, three, four or more single curb chains can be aligned, tack welded, diamond-cut at abutting surfaces to form planar soldering (brazing) surfaces, compressed, hammered, flexibilized and, optimally, further diamond-cut to form further unique, brilliant, surface-textured chain designs. In addition, the herein described process may be utilized with open link chain of other designs such as figaro chain, venetian box chain, or double curb chain.

Other modifications will be made by those normally skilled in the jewelry arts, and we intend that the scope of this invention is to be limited only by the claims which follow.

I claim:

1. A process for making non-apertured jewelry chain, comprising precious or non-precious metal, from multiple chains of intertwined open links, which comprises the steps of:

(a) aligning the said open links of each of said multiple chains in side by side abutting relationship;

(b) bonding the said multiple chains together in said side-by-side relationship, said bonded chain having a longitudinal axis;

(c) compressing the said bonded multiple chain, along its longitudinal axis, to close the gaps within said open links of said multiple chain, and form a non-apertured compressed chain;

(d) hammering said non-apertured compressed chain to form a rigid flattened chain; and (e) flexibilizing said rigid flattened chain, to form said non-apertured jewelry chain.

2. The process of claim 1 wherein the said multiple chains of intertwined open links are chains selected from the group consisting of left and right curb chains, venetian box chains and figaro chains.

3. The process of claim 1 wherein said aligned multiple open link chains are bonded by welding at areas of abutment of said chains.

4. The process of claim 1 wherein said aligned multiple open link chains are bonded by:

(i) creating planar surfaces on abutting portions of the interior sides of each of said multiple open link chains, (ii) tack welding said multiple open link chains at one or more areas adjacent said planar surfaces, and (iii) fusing the planar surfaces of each of said multiple open link chains.

5. The process of claim 4 wherein said planar surfaces are made by diamond-cutting.

6. The method of claim 1 wherein the surface of said non-apertured jewelry chain in step (e) is diamond-cut to achieve further brilliance.

7. The method of claim 6 wherein the surface of said non-apertured jewelry chain in step (e) is diamond-cut to achieve further brilliance and outer edges of said jewelry chain are beveled.

8. A compressed jewelry chain made by the process of claim 1.

9. A compressed jewelry chain made by the process of claim 4.

10. A process for making non-apertured jewelry chain, comprising precious or non-precious metal, from multiple chains of intertwined curb links, which comprises the steps of:

(a) aligning the said curb links of each of said multiple chains in side by side abutting relationship;

(b) bonding the said multiple chains together in said side-by-side relationship by providing planar surfaces on abutting portions of the interior sides of each of said multiple curb link chains, tack welding said multiple curb link chains at one or more areas adjacent said planar surfaces and fusing said planar surfaces of each of said multiple curb link chains, said bonded chain having a longitudinal axis;

(c) compressing the said bonded chain, along its longitudinal axis, to substantially completely close the gaps within said curb links of said multiple chain, and form a non-apertured compressed chain;

(d) hammering said non-apertured compressed chain to form a rigid flattened chain; and (e) flexibilizing said rigid flattened chain, to form said non-apertured jewelry chain.

11. The method of claim 10 wherein the surface of said non-apertured jewelry chain in step (e) is diamond-cut to achieve further brilliance.

12. The method of claim 10 wherein the surface of said non-apertured jewelry chain in step (e) is diamond-cut to achieve further brilliance and outer edges of said jewelry chain are beveled.

13. A compressed jewelry chain made by the process of claim 10.

14. A compressed jewelry chain made by the process of claim 12.

* * * * *